Aug. 17, 1954

A. J. BARACKET ET AL

AUTOMATIC SYNCHRONIZATION 2,686,833

Filed April 22, 1952

2 Sheets-Sheet 1

INVENTORS
ALBERT J. BARACKET
EMANUEL STEIN
BY Percy P. Lantzy
ATTORNEY

Aug. 17, 1954 A. J. BARACKET ET AL 2,686,833

AUTOMATIC SYNCHRONIZATION

Filed April 22, 1952 2 Sheets-Sheet 2

INVENTORS
ALBERT J. BARACKET
EMANUEL STEIN
BY Percy P. Lantzy
ATTORNEY

Patented Aug. 17, 1954

2,686,833

UNITED STATES PATENT OFFICE 2,686,833

AUTOMATIC SYNCHRONIZATION

Albert J. Baracket, Bloomfield, and Emanuel Stein, Fair Lawn, N. J., assignors to International Telephone and Telegraph Corporation, a corporation of Maryland Application April 22, 1952, Serial No. 283,722

20 Claims. (Cl. 178—69.5)

This invention relates to synchronizing circuits and more particularly to automatic synchronizing of sweep circuits from either driving synchronizing pulses or a composite video signal of a television or similar system.

In television studios, a number of picture and waveform monitors are required at various locations for checking or monitoring purposes. The number of different signals that one particular monitor surveys may vary from one to a dozen or more. Some of these signals will be at the output of camera control or iconoscope film equipments and as such will contain only a video signal and a blanking or pedestal signal. The remaining signals surveyed will be from master control, or from a relay link receiver, or similar equipment, in which case the signal will contain in addition to the video and blanking signal, the mixed synchronizing pulses.

The synchronization of monitor sweep circuits in the prior art depends on either of the following schemes. Monitors have been synchronized from the separated synchronizing pulses on a composite video signal or from the horizontal and vertical driving pulses separately connected in the case where the signal input is a video signal without synchronizing pulses. To facilitate the operation of such a system, a station technician must operate a "sync-drive" switch in order to change from monitoring a composite signal to monitoring a video signal where synchronizing pulses are not present therein. The other scheme for synchronizing monitors includes the same provisions as the previous scheme with the difference residing in the installation of a special synchronizing pulse inserter located ahead of the picture monitor. This special inserter places a synchronizing pulse in all video signals coming from the camera, removing the necessity of the technician operating a "sync-drive" switch of the previous scheme.

The first system is objectionable due to the necessity of manually causing the synchronizing pulses for the monitor sweep circuits from an external source of driving pulses to be introduced when synchronizing pulses are not present in the video signal being monitored. The latter scheme provides that synchronizing pulses will be present in the video signals regardless of the location of monitoring. However, this requires an extra expenditure by the station for the equipment necessary to insert these synchronizing pulses. Therefore, it is an object of this invention to provide circuitry which causes television sweep circuits to be automatically synchronized, regardless of whether the video signal does or does not contain synchronizing pulses.

A feature of this invention is the utilization of the novel circuitry to cause a television monitor sweep circuit to be automatically synchronized from either separate horizontal and vertical driving synchronizing pulses, hereafter referred to as driving pulses, or from the pulses derived from the composite picture signals. The circuitry hereinafter described depends for its operation upon the character of the input signal itself, and eliminates the need for an operator's manual selection or the installation of extra equipment to insert synchronizing pulses into each camera signal to be monitored.

Another feature of this invention is the connection of the horizontal and vertical driving pulses to the regular synchronizing pulse separating circuit of the television monitor through an amplifier circuit, one for each of the sweep circuits. The circuitry is so arranged that the incoming signal, with or without synchronizing pulses develops a voltage which is applied to the amplifier circuits such that if a synchronizing pulse is available on the incoming signal, then the stripped synchronizing pulse therefrom is passed to the sweep circuits for synchronizing the television sweep circuits. However, if the incoming signal contains no synchronizing pulses, then the voltage thereby developed is such as to allow passage of the driving pulses to synchronize the television sweep circuits.

The above-mentioned and other features and objects of this invention will become more apparent by reference to the following description taken in conjunction with the accompanying drawings, in which.

Figure 1:
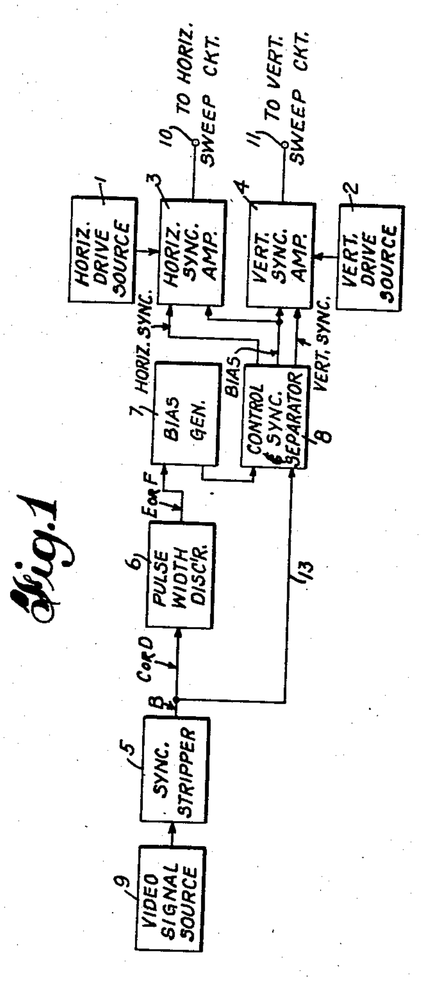
Fig. 1 is a block diagram of an embodiment in accordance with the principles of this invention.

Referring to Fig. 1, a block diagram is illustrated wherein the horizontal and vertical synchronizing driving sources 1 and 2 are connected at all times to their respective amplifier circuits 3 and 4, incorporated as a portion of the synchronizing pulse separating circuit of a television receiver, shown in this instance as a synchronizing pulse separating circuit of a television studio monitor. The synchronizing pulse separating circuit illustrated in this embodiment comprises a pulse detector which includes a synchronizing stripper 5 and a pulse width discriminator or pulse shaper 6 and a control device which includes a bias generator 7 and a control and synchronizing separator circuit 8. The video signal from video source 9, with or without synchronizing pulses, is shown entering the synchronizing separating circuit. This video source is preferably a video amplifier incorporated in the picture-synchronizing pulse separator section of a television picture monitor. As hereabove explained, this video signal may come from a camera chain ahead of the synchronizing circuit in which case synchronizing pulses normally will not be present, or this video signal may be a composite picture signal from a remote location in which case the synchronizing pulses will be present. In the former situation, the synchronizing pulses are applied to the sweep circuits automatically from the driving sources 1 and 2, while in the latter situation, the synchronizing pulses applied to the sweep circuits are derived from the composite picture signal and the pulses from the driving sources 1 and 2 are automatically removed or blocked from the input terminals 10 and 11 of the horizontal and vertical sweep circuits, respectively.

The video signal from the source 9, with or without synchronizing pulses, is applied to the synchronizing stripper 5 comprising a pentode type electron discharge device having a sharp cut-off characteristic. Incorporated in the control grid circuit of this electron discharge device is located a D.-C. restoring circuit which cooperates with the sharp cut-off characteristic of said device to separate the synchronizing pulses from the video signal of a composite picture signal. The components employed in the D.-C. restoring or clamping circuit are so arranged that between 10% and 20% of the pulse tips will be clipped and will appear at the anode electrode of the device 5 irrespective of whether synchronizing pulses are present or not. Thus, at the anode electrode there is present a pulse train comprising amplified clipped horizontal and vertical synchronizing pulses in the case of a composite video signal or the horizontal and vertical blanking pulse clipped tops in the case of a video signal without synchronizing pulses. The pulse train at the anode is then conducted to two points in the system, one point being the pulse width discriminator or shaper 6, and the other point being the control device 8.

In the output circuit of control device 8, the horizontal and vertical synchronizing pulses, when present in the video signal, are separated for application to their respective sweep circuits through amplifiers 3 and 4. A detailed description of the operation of the devices 5, 6, 7, and 8 will follow hereinbelow in connection with Fig. 3.

It may be generally stated that the input to shaper 6 will consist of either an amplified clipped horizontal synchronizing pulse in the case of a composite picture signal or a clipped pedestal or blanking pulse in the case of a video signal without synchronizing pulses. Shaper 6 is further characterized by having a delay line in its plate circuit having an electrical length equal to somewhat greater than one-half the horizontal synchronizing pulse duration, for instance, approximately 3 microseconds. The delay line is open at its far end providing an approximate delay of 6 microseconds before the delayed pulse will appear at the output of the shaper 6. This delayed pulse as well as the undelayed pulse is applied to the input of the bias generator 7.

Figure 2:
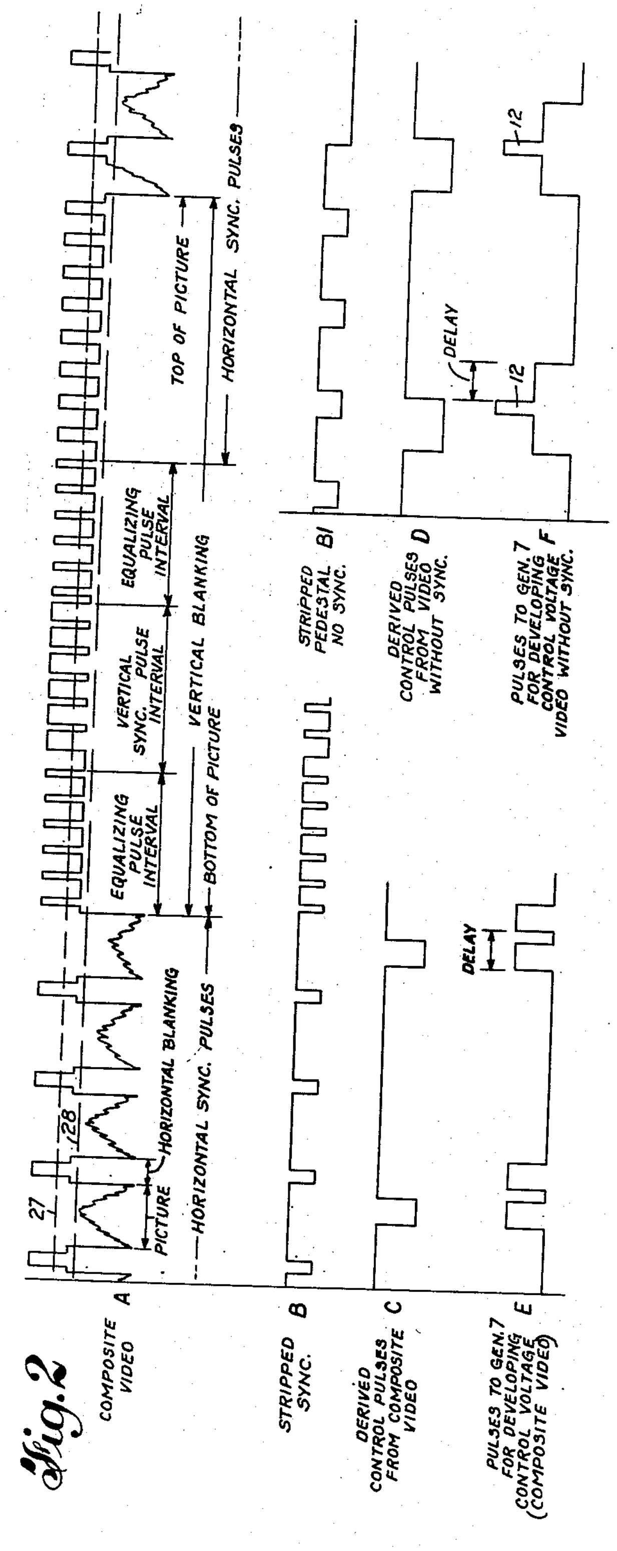
Fig. 2 illustrates waveforms at the indicated points in Fig. 1 for control of the synchronizing pulses to be applied to the television sweep circuits.

Fig. 2 illustrates in curve A a representative composite picture signal applied to synchronizing stripper 5, in curve B the clipped signal at the output of stripper 5 derived from curve A, in curves C and D the two possible video signals that may be present at the input to the pulse shaper 6, and in curves E and F the respective resultant output therefrom, including the original pulse and the time delayed pulse. In the case of a composite picture signal as shown in curve A, the stripped horizontal synchronizing pulses of curve C are applied to the input to the shaper 6, producing at the output therefrom the two pulses with a very short separation therebetween, as shown in the curve E. In the case of a picture signal or video without synchronizing pulses similar to curve A if the synchronizing and equalizing pulses were removed therefrom, the blanking or pedestal pulses of curve D are applied to the input of the shaper 6, producing at the output therefrom the pulses as shown in the curve F. The narrow pips or peaks 12 are caused by the overlap or coincidence in part between the blanking pulses of curve D and its delayed counterpart. It would of course be possible to clip or strip the curve A in such a manner that if synchronizing pulses are present, a control voltage will be produced and the absence of synchronizing pulses will produce no control voltage. Changes may be made in the circuit responsive to control voltages to provide a functioning of these circuits in the presence or absence of control voltages in a manner substantially as herein described in accordance with the control voltages developed by pulses of curves E and F.

The output of the bias generator 7 of Fig. 1 is applied to an integrating circuit whose D.-C. output is negative and proportional to the duration of the elevated pulse 12, shown in curve F of Fig. 2, which is of sufficient amplitude to overcome the negative bias on its grid. For the sharper pulses 12 resulting from the application of a video signal without synchronization pulses, considerable D.-C. will be generated. For the double pulse with a narrow separation, as shown in curve E, very little D.-C. will be generated. Such an integrating circuit incorporated in a model of an embodiment of this invention allows the attainment of a D.-C. voltage change from —0.5 volt to —9.0 volts for the two conditions which may be present. The resultant D.-C. voltage from the integration circuit, with or without amplification, is used to determine whether the stripped synchronizing pulses from a composite type picture signal, substantially as shown in curve B, or the horizontal and vertical driving pulses from sources 1 and 2, respectively, are to enter the sweep circuits, by terminals 10 and 11, of the monitor. Therefore, the choice of using the synchronizing pulses from a composite picture signal or the horizontal and vertical driving pulses depends on the character of the signal itself, thereby producing an automatic synchronization of the monitor sweep circuits.

An electron discharge device included in control device 8 is biased to cut-off by a voltage from the integrating circuit located at the output of the bias generator 7 when under the influence of a video signal without synchronizing pulses. With the electron discharge device of control device 8 cut-off, no synchronizing pulses may be derived therefrom. However, synchronizing pulses are presented to terminals 10 and 11 from the horizontal and vertical driving sources 1 and 2 through the amplifier devices 3 and 4, respectively. When the integrating circuit is under the influence of a composite picture signal, electron discharge device of control device 8 will be biased such that it may conduct, passing and separating the horizontal and vertical synchronizing pulses which have been fed from the output of device 5 to the control device 8 through conductor 13. The conduction of control device 8 provides for blocking of the pulses from sources 1 and 2 and allows the presentation of the derived synchronizing pulses to the terminals 10 and 11 through devices 3 and 4, respectively.

Figure 3:
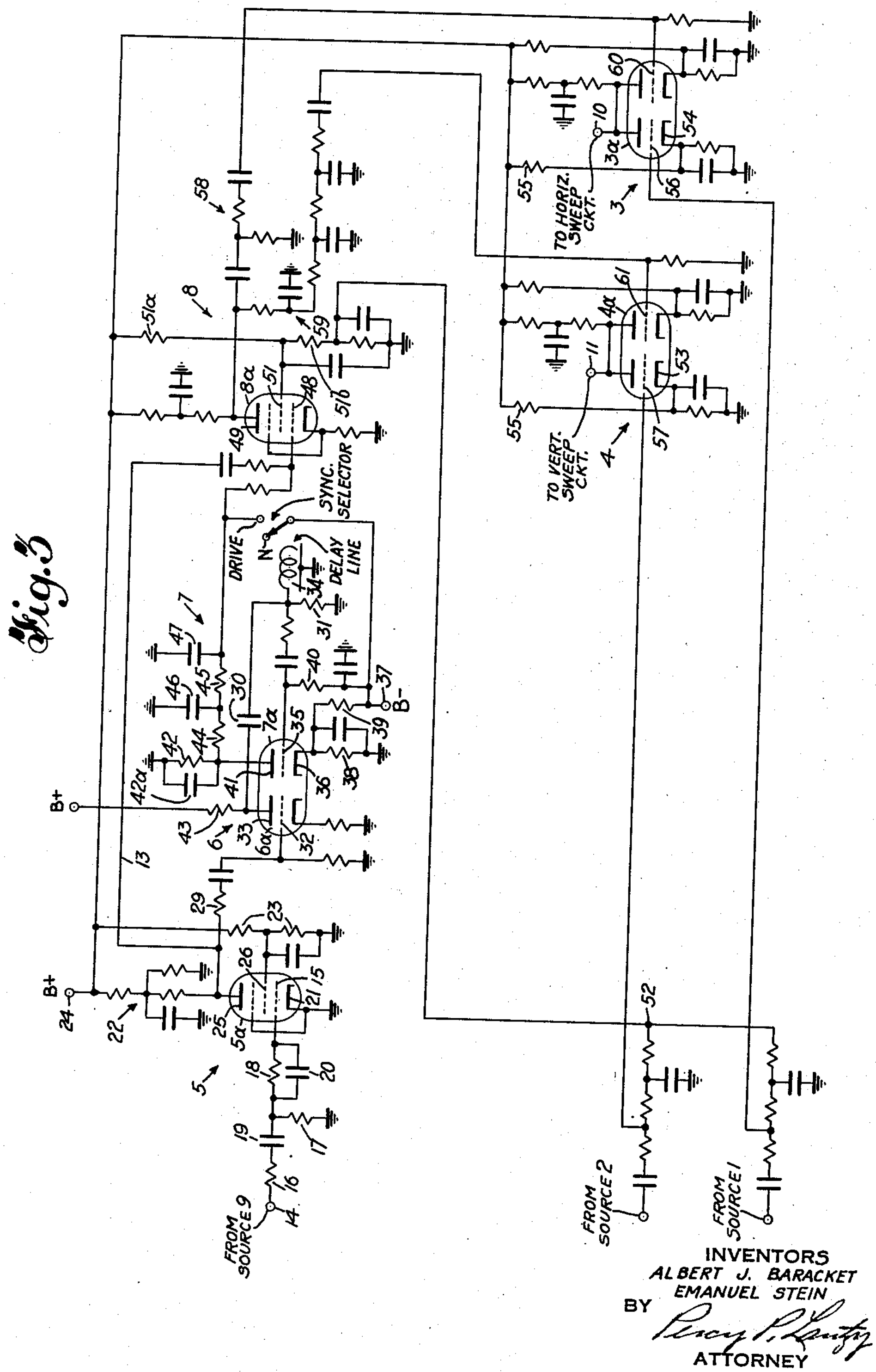
Fig. 3 is the preferred schematic diagram of Fig. 1.

The schematic diagram of the embodiment, as above described, is illustrated in Fig. 3. Video signal, with or without synchronizing pulses, from source 9 is applied to terminal 14 where it is influenced by the grid-leak bias and electron discharge device 5*a*. The grid-leak bias and D.-C. restoring circuits comprise resistors 16, 17, 18, condensers 19, 20, and the grid 15 and cathode 21 of the pentode type electron discharge device 5*a*. Grid 15 and cathode 21 function as a diode component of the D.-C. restoring circuit in this embodiment with the remaining portions of the pentode device 5*a* functioning as an amplifier, resistors 22, 23, and a plate potential, of say +150 volts, at terminal 24 providing the appropriate anode 25 and screen grid 26 potential for amplification.

The operation of device 5*a* and its associated circuitry including the grid-leak and D.-C. restoring circuits is to remove the synchronizing pulses from the video signal and amplify these derived pulses for application to the appropriate points in the system for automatically synchronizing a television monitor whether the video signal contains synchronizing pulses or not. When the video signal has no synchronizing pulses, the portion of the blanking pulses removed from the video signal operates on the control device 8 such that synchronism is obtained from the driving sources 1 and 2.

Curve A of Fig. 2 illustrates a composite picture signal which may be present at terminal 14. A representative waveform of a video signal without synchronizing pulses may be obtained by removing the illustrated synchronizing pulses from curve A. The component values of the control grid circuit of device 5*a* are chosen to cooperate with the sharp cut-off characteristic of device 5*a* to slice a section from the curve A as indicated by the dotted line 27. Thus, the synchronizing pulses are separated from the video signal, and at the anode of device 5*a* would be found an amplified pulse train, substantially as shown in curve B. In the case of a video signal without synchronizing pulses, only the pedestal pulses will be present, however, the amplitude of this pedestal portion under this condition will be large due to the inherent operation of the D.-C. restoring circuit. Such a pulse train is shown in curve B1 as may be obtained by slicing a section between top of pedestal pulse and dotted line 28 of curve A, synchronizing pulses being absent. From the anode of device 5*a* either of these two signals, depending upon the signal from source 9, will be conducted to the control grid circuit of electron discharge device 6*a* and the control grid circuit of device 8*a*.

The conduction of the pulses of curve B to the grid circuit of device 6*a* is provided by resistor 29. The grid 32 will be influenced principally by the horizontal synchronizing pulses, as substantially shown in curve C, enlarged for clarity, when synchronizing pulses are present on the video signal. The vertical synchronizing pulse, occurring only 60 times per second as compared with 15,750 horizontal synchronizing pulses per second, contributes only the small bias of approximately 0.5 volt at the output of the bias generator in the presence of synchronizing pulses at input 14. If there is present video without synchronizing pulses, the pedestal pulse of curve D will appear at grid 32, due to the peak clipping action of device 5*a*. The positive pulse output of electron discharge device 6*a* at anode 33 is applied to the delay line 34 to produce a pulse having a delay time of approximately 6 microseconds from the leading edge of the original positive pulse output at anode 33, this original positive pulse corresponding in time relation to the negative pulse at grid 32. The input to the bias generator electron discharge device at grid 35 will be substantially as shown in curves E or F of Fig. 2 depending upon the signal applied to the input terminal 14. Provisions are made to establish the proper cathode 36 potential and grid 35 potential by applying a negative potential to terminal 37 and employing the resistance network comprising resistors 38, 39, and 40. In a bias generator where it is desired to develope a negative control voltage, a negative potential is applied to the cathode 36, of say —135 volts, and then for proper operation the anode 41 is grounded through a plate load resistor 42. Also, to establish the proper swing of plate voltage in anode 33 of the device 6*a* to effect the required operation of the delay line 34 and the bias generator discharge device 7*a*, it is necessary to maintain anode 33, through resistor 43, at an anode supply source of higher magnitude than the other electron discharge device of the circuit. The preferred anode supply potential applied to device 6*a* is approximately +250 volts.

When there is present at the input to the bias generator discharge device 7*a* pulses substantially as indicated in curve E of Fig. 2, very little pulse voltage will appear across anode load resistor 42, due to the magnitude of the static negative bias voltage applied to grid 35 with respect to cathode 36, which is sufficient to keep the electron discharge device 7*a* cut off in the presence of these pulses at grid 35. Under these conditions during the presence of the vertical synchronizing pulse acting in conjunction with the delayed pulses introduced by the delay line 34, the amplitude of the pulse present at grid 35 will be sufficient to cause the electron discharge device 7*a* to conduct during a relatively small interval. The effect of the vertical synchronizing pulse under these conditions is further minimized by the introduction of a differentiating circuit or high pass filter comprising condenser 30 and resistor 31 between anode 33 and input to the delay line 34 which has a time constant designed to essentially pass the horizontal synchronizing pulses and pedestal pulses and to discriminate or render comparatively ineffective the vertical synchronizing pulse. However, in the presence of elevated pulse 12 at the input to the bias generator discharge device 7*a*, substantially as indicated in curve F of Fig. 2, there is sufficient amplitude to overcome the negative bias of electron discharge device 7*a* and cause conduction of anode current during the duration of the pulse 12. In this case partially integrated pulses in a negative sense appear across anode load 42 bridged by condenser 42a. This pulsating voltage across resistor 42 acts as a source for the integrating circuit hereabove described in connection with Fig. 1. The integrating circuit comprises resistors 44, 45 and condensers 46, 47 with condenser 47 developing a D.-C. voltage having a negative sense and proportional to the duration of the pulse applied to grid 35 of the bias generator electron discharge device 7a when this signal has sufficient amplitude to cause conduction. Due to the biasing arrangement therein incorporated and the considerations described above, a very small negative D.-C. voltage will be developed when the circuit is influenced by a composite picture signal, while a large amount of negative D.-C. voltage will be available when the circuit is influenced by a video signal without synchronizing pulses. This large amount of D.-C. voltage, as hereinabove described, is due to the large amplitude peak or pip 12 in curve F of Fig. 2 caused by the overlapping of the original pulse and its delayed counterpart. Thus the D.-C. voltage developed at condenser 47, dependent upon the signal being monitored, determines whether the control and synchronizing separator 8 is made operative or inoperative.

When the signal being monitored is a composite picture signal, the negative D.-C. voltage applied to grid 48 biases the control discharge device 8a such that it will be operative allowing the passage of the synchronizing pulses from the grid 48 to the anode 49. These synchronizing pulses being conducted through control device 8a are derived from anode 25 of electron device 5 and conducted therefrom by conductor 13. However, if the signal being monitored is a video signal without synchronizing pulses, the negative D.-C. voltage applied to grid 48 will be very large. This large negative voltage biases the control device 8a below cut-off, making it inoperative. In such an instance, the pedestal pulse conducted through conductor 13 will not be passed.

Further, besides the normal operation of biasing device 8a, synchronizing selector control 50 is available at the grid 48 of the control device 8a which allows the operator, if desired, to permanently bias device 8a below cut-off. Thus synchronization of the sweep circuits will then be derived from the driving sources 1 and 2 at all times.

Continuing with the remaining portion of the automatic synchronizing circuit, it will be obvious to those skilled in the art that when control device 8a is inoperative, there is no current drawn by screen grid 51, therefore, the potential at point 52 will be approximately equal to the anode supply potential at terminal 24 minus the potential drop determined by the resistance divider circuit composing resistances 51a and 51b. Further, the cathodes 53 and 54 of the vertical synchronizing amplifier 4a and the horizontal synchronizing amplifier 3a, respectively, have a positive potential established thereon at a value equivalent to the anode source at terminal 24 minus the voltage drop across resistors 55. Under these potential conditions, the synchronizing pulses from sources 1 and 2 are presented to the grids 56 and 57 of the horizontal amplifier 3a and the vertical amplifier 4a, respectively, for amplification and presentation to the vertical sweep circuit through terminal 11 and the horizontal sweep circuit through terminal 10.

However, when control tube 8a is operative, the synchronizing pulses appear at plate 49. Through means provided by the resistive-capacitive networks 58 and 59, the synchronizing pulses are separated for application to grids 60 and 61 of amplifiers 3a and 4a. Network 58 forms a high-pass filter which essentially passes the horizontal synchronizing pulses only, while network 59 forms a low pass filter which essentially passes the vertical synchronizing pulses only. Simultaneously, current is drawn by screen grid 51 of control device 8a causing the potential at point 52 to decrease. This decrease of potential is such that grids 56 and 57 are negative with respect to cathodes 54 and 53, respectively, causing these sections of the double triode devices 3a and 4a to be inoperative. Thus, the separated synchronizing pulses from the networks 58 and 59 are amplified and presented for synchronism of their respective sweep circuits.

The embodiment hereabove described provides for automatically synchronizing television monitor sweep circuits from either separate horizontal and vertical driving pulses or the composite picture signals by the means of establishing a proper bias on control device 8a and amplifiers 3a and 4a. The establishment of this bias depends wholly on the characteristics of the incoming signal itself which, in the manner hereabove described, automatically synchronizes the monitor sweep circuits.

While we have described above the principles of our invention in connection with specific apparatus, it is to be clearly understood that this description is made only by way of example and not as a limitation to the scope of our invention as set forth in the objects thereof and in the accompanying claims.

We claim:

1. An automatic synchronizing system for television monitoring comprising a source of video signals, detector means responsive to signals of said source to produce control voltages in accordance with the presence or absence of synchronizing pulses in said video source, an independent source of driving synchronizing signals, and gate means in control of the output of said independent source, said gate means being responsive to said control voltages to pass synchronizing signals from said independent source when there is an absence of synchronizing signals in said video source.

2. An automatic synchronizing system according to claim 1, wherein said detector means includes stripping means to remove synchronizing signals from said video source for application to said gate means.

3. An automatic synchronizing system according to claim 2, wherein said stripping means comprises a sharp cut-off pentode type electron discharge device and a clamping circuit including the control grid and the cathode of said pentode type device and a resistive-capacitive network coupled between said control grid and said cathode, the output of said clamping circuit being electron coupled to the remaining elements of said pentode device for amplification.

4. An automatic synchronizing system according to claim 2, wherein said gate means comprises an electron discharge device, a synchronizing signal separator coupled to the anode of said discharge device for separating the synchronizing signals of said video source into horizontal and vertical components, and a bias network coupled between said discharge device and said synchronizing separator to eliminate the passage of driving synchronizing signals from said independent source in the presence of synchronizing signals in said video source.

5. An automatic synchronizing system according to claim 4, wherein said synchronizing signal separator comprises a filter network and an amplifier unit, said amplifier unit being responsive to the respective components of the synchronizing signal of said video source where derived therefrom in said filter network, and being responsive to the driving synchronizing signals from said independent source in the absence of synchronizing signal in said video source for passage of the selected synchronizing components.

6. An automatic synchronizing system according to claim 5, wherein said filter network comprises a high pass section and a low pass section, said high pass section passing the horizontal synchronizing component and said low pass section passing the vertical synchronizing component to their respective sections of said amplifier unit.

7. An automatic synchronizing system according to claim 5, wherein said amplifier unit comprises a horizontal synchronizing section and a vertical synchronizing section, each section characterized to be responsive to the voltage from said bias network to pass or block synchronizing components from said independent source depending upon the absence or presence of the synchronizing signal in said video source, respectively.

8. An automatic synchronizing system according to claim 4, wherein said bias network is coupled to said electron discharge device for development of a positive voltage on the control grid of said amplifier unit when said electron discharge device is non-conductive and a less positive voltage when said electron discharge device is conductive.

9. An automatic synchronizing system according to claim 4, wherein said electron discharge device comprises a pentode type device maintained non-conductive by said control voltages when synchronizing signals are absent from said video source and conductive when synchronizing signals are present in said video source.

10. An automatic synchronizing system according to claim 9, further including a switching means coupled to the control grid of said pentode type device to render said pentode type device non-conductive at the discretion of an operator.

11. An automatic synchronizing system according to claim 1, wherein said independent source comprises a horizontal driving source and a vertical driving source coupled to said gate means for production of synchronism in the monitor sweep circuits in the absence of synchronizing signals in said video source.

12. An automatic synchronizing system according to claim 2, wherein said detector means further includes a pulse width discriminator accepting the stripped synchronizing signal from said stripping means in the case of a composite video signal in said video source and pedestal pulses only when the video signal of said source is without synchronizing signals, a bias voltage generator, means to apply to said generator the pulse output of said discriminator, said generator producing a large negative control voltage when synchronizing signals are present in said video source and a small negative control voltage when pedestal pulses only are present in said video source.

13. An automatic synchronizing system according to claim 12, wherein said bias generator comprises a triode type electron discharge device coupled to said pulse width discriminator and an integrating circuit coupled to the anode of said triode device, said integrating circuit being responsive to the amplitude-time duration of the pulses present at the control grid of said triode device when conducting, the output of said integrating circuit providing said control voltages to bias said gate means to pass synchronizing signals from said independent source when there is an absence of synchronizing signals in said video source.

14. An automatic synchronizing system according to claim 12, wherein said pulse width discriminator comprises a triode type electron discharge device, a delay line coupled to the anode of said triode device, and a filter network coupled between said anode and said delay line, said filter network comprises a high pass filter section to reduce the amplitude of the vertical synchronizing pulse to a tolerable amount prior to application to said delay line, said vertical pulse being present in said stripped synchronizing signal.

15. An automatic synchronizing system according to claim 14, wherein said delay line has an electrical length slightly greater than one-half the time duration of a horizontal synchronizing pulse in said video source whereby the output from said pulse width discriminator includes the original pulse and its delayed counterpart produced by said delay line.

16. An automatic synchronizing system according to claim 15, wherein said delay line has a delay characteristic slightly greater than the duration of a horizontal synchronizing pulse but less than the duration of a pedestal pulse thereby producing at the output of said discriminator an original synchronizing pulse and its delayed counterpart slightly separated in time in the case of composite video from said video source and an overlapped original pedestal pulse and its delayed counterpart in the case of video without synchronizing signals from said video source.

17. In an automatic synchronizing system for television monitoring, a detector means to produce control voltages in accordance with the presence or absence of synchronizing pulses in a source of video signals comprising a pulse width discriminator including an electron discharge device, a high pass filter section, and an open-ended delay line, a bias generator, stripping means to remove synchronizing pulses from said video signals, said discriminator discriminating between horizontal synchronizing pulses and horizontal blanking pulses coupled from said stripping means to the control grid of said discriminator, said open-ended delay line coupled between the anode of said discriminator and said bias generator through said high pass filter section developing pulses determined by the presence or absence of synchronizing signals in said source of video signals, and an integrating circuit coupled between the output of said bias generator and a means responsive to the control voltages developed in said integrating circuit proportional to the amplitude-time duration of the pulses produced by the cooperation of said discriminator and the biasing arrangement of said bias generator.

18. In an automatic synchronizing system for television monitoring, a means to pass synchronizing signals from a video signal source comprising a stripping means to remove synchronizing signals from a composite video signal from said source, a detector responsive to synchronizing signals from said stripping means to produce a control voltage, and a gate circuit coupled to the output of said stripping means, said gate circuit being responsive to the control voltage from said detector to pass synchronizing pulses from said stripping means.

19. In an automatic synchronizing system according to claim 18, wherein said gate circuit comprises an electron discharge device, a synchronizing signal separator coupled to the anode of said discharge device for separating said synchronizing signal into its horizontal and vertical components, and a bias network coupled between said discharge device and said synchronizing separator to eliminate the passage of driving synchronizing signals from an independent synchronizing source in the presence of synchronizing signals at said video source.

20. In an automatic synchronizing system according to claim 19, wherein said synchronizing signal separator comprises a filter network and an amplifier unit having a control grid, said amplifier unit characterized to be responsive to the respective components of said synchronizing signal derived in said filter network under a first condition where there are synchronizing signals in said video source and responsive to said driving synchronizing signals under a second condition where there is an absence of synchronizing signals in said video source, said electron discharge device having a screen grid electrode and said bias network being coupled to said screen grid electrode for development of a positive voltage on the control grid of said amplifier unit when said device is conductive under said first condition and a less positive voltage when said device is non-conductive under said second condition providing for the proper selection and passage of the synchronizing signals.

References Cited in the file of this patent

UNITED STATES PATENTS

| Number | Name | Date |
|---|---|---|
| 2,515,613 | Schoenfeld | July 18, 1950 |
| 2,570,775 | De Baun | Oct. 9, 1951 |